(12) United States Patent
Holmstrom et al.

(10) Patent No.: US 12,151,744 B2
(45) Date of Patent: Nov. 26, 2024

(54) PILLAR CHANNEL SEALS AND VEHICLES INCLUDING SAME

(71) Applicant: Toyota Motor Engineering & Manufacturing North America, Inc., Plano, TX (US)

(72) Inventors: Adam D. Holmstrom, Pinckney, MI (US); Paxton S. Williams, Milan, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 223 days.

(21) Appl. No.: 17/890,470

(22) Filed: Aug. 18, 2022

(65) Prior Publication Data
US 2024/0059356 A1 Feb. 22, 2024

(51) Int. Cl.
| | |
|---|---|
| *B62D 25/04* | (2006.01) |
| *B60R 13/07* | (2006.01) |
| *B60R 13/08* | (2006.01) |
| *B62D 25/07* | (2006.01) |
| *B62D 29/00* | (2006.01) |

(52) U.S. Cl.
CPC ............. *B62D 25/04* (2013.01); *B60R 13/07* (2013.01); *B60R 13/08* (2013.01); *B60R 13/0815* (2013.01); *B62D 25/07* (2013.01); *B62D 29/002* (2013.01)

(58) Field of Classification Search
CPC . B60R 13/08; B60R 13/0815; B60R 13/0846; B60R 13/07; B62D 29/002

USPC ......... 296/213, 193.06, 208, 187.02
See application file for complete search history.

(56) References Cited

U.S. PATENT DOCUMENTS

| | | | | |
|---|---|---|---|---|
| 7,726,442 | B2 * | 6/2010 | Belpaire | B62D 29/002 |
| | | | | 296/193.06 |
| 8,444,214 | B2 * | 5/2013 | Helferty | B60R 13/07 |
| | | | | 296/187.02 |
| 9,731,774 | B2 | 8/2017 | Teramoto et al. | |

FOREIGN PATENT DOCUMENTS

| | | | | |
|---|---|---|---|---|
| CN | 206231328 | U | 6/2017 | |
| CN | 206406990 | U | 8/2017 | |
| CN | 210852318 | U | 6/2020 | |
| CN | 216424569 | U | 5/2022 | |
| EP | 0447944 | B1 * | 1/1995 | |
| JP | 4922672 | B2 * | 4/2012 | ............ B60J 1/1823 |
| JP | 2013169995 | A * | 9/2013 | |
| KR | 1020200049157 | A | 5/2020 | |

OTHER PUBLICATIONS

JP2013169995 Text (Year: 2013).*
JP4922672 (Year: 2012).*
EP-0447944-B1 Text (Year: 1991).*

* cited by examiner

*Primary Examiner* — Dennis H Pedder
(74) *Attorney, Agent, or Firm* — Dinsmore & Shohl LLP

(57) ABSTRACT

A vehicle includes a vehicle body comprising a pillar having a pillar channel extending therethrough. A pillar channel seal includes a seal body located in the pillar channel. The seal body has a pass-through opening sized to receive a drain hose. A moveable plug is movably attached to the seal body that is configured to cover the pass-through opening in a closed configuration. An expandable foam is carried by the moveable plug.

12 Claims, 2 Drawing Sheets

PILLAR CHANNEL SEALS AND VEHICLES INCLUDING SAME

TECHNICAL FIELD

The present specification generally relates to vehicles and, more specifically, to vehicles including pillars with pillar channel seals.

BACKGROUND

Some vehicles have sunroofs that can be exposed to the environment. Such vehicles may use a drain hose to carry away water from the sunroof area and the drain hose may pass through one of the vehicle pillars to route the water toward the ground in a predetermined way. In this regard, the drain hose may pass through a channel that is formed through the vehicle pillars. The channel can also provide a passageway for noise to enter the passenger compartment of the vehicles. A pillar seal may be provided that can be used to block the channel and reduce noise when the drain hose is present. The drain hose may pass through an opening in the pillar seal. However, vehicles that do not have sunroofs, and thus no drain hose, may have pillar seals with openings through which no drain hose passes. These opening can allow the passage of noise through the channel.

Accordingly, a need exists for alternative pillar seal structures for sealing pillar channels and reducing noise passing therethrough.

SUMMARY

In one embodiment, a vehicle includes a vehicle body comprising a pillar having a pillar channel extending therethrough. A pillar channel seal includes a seal body located in the pillar channel. The seal body has a pass-through opening sized to receive a drain hose. A moveable plug is movably attached to the seal body that is configured to cover the pass-through opening in a closed configuration. An expandable foam is carried by the moveable plug.

In another embodiment, a pillar channel seal configured to be located in a pillar channel of a vehicle includes a seal body having a pass-through opening sized to receive a drain hose. A moveable plug is movably attached to the seal body that is configured to cover the pass-through opening in a closed configuration. An expandable foam carried by the moveable plug.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally directed to pillar channel seals that are used to seal pillar channels of vehicles for reducing noise passage through the pillar channels. The pillar channel seals include a seal body that is sized and configured to be received inside the pillar of the vehicle. The seal body has a pass-through opening that is sized to receive a drain hose therethrough. A movable plug may at least partially cover the pass-through opening. An expandable foam may be carried by the moveable plug. The expandable foam can expand to fill a gap between the moveable plug and the seal body when the moveable plug is in a closed configuration. The expandable foam can be formed as part of the seal body, for example, through a two-shot molding process and/or a 3D orienting process.

As used herein, the term "vehicle longitudinal direction" refers to the forward-rearward direction of the vehicle (i.e., in the +/−vehicle X-direction as depicted). The term "vehicle lateral direction" refers to the cross-vehicle direction of the vehicle (i.e., in the +/−vehicle Y-direction as depicted), and is transverse to the vehicle longitudinal direction. The term "vehicle vertical direction" refers to the upward-downward direction of the vehicle (i.e., in the +/−vehicle Z-direction as depicted).

Further, the terms "inboard" and "outboard" are used to describe the relative positioning of various components of the vehicle. The term "outboard" as used herein refers to the relative location of a component in direction 1 with respect to a vehicle centerline 2. The term "inboard" as used herein refers to the relative location of a component in direction 3 with respect to the vehicle centerline 2. The vehicle 10 may be generally symmetrical about the vehicle centerline 2. Further, while certain components of the vehicle 10 are described as extending in one of the identified directions or oriented toward one of the identified directions, it should be understood that these components extend or are oriented in at least these recited directions.

Motor vehicles that incorporate elements according to the present disclosure may include a variety of construction methodologies that are conventionally known, including the unibody construction methodology as depicted, as well as a body-on-frame construction methodology. While the embodiments of the present disclosure are described and depicted herein in reference to unibody structures, it should be understood that vehicles that are constructed with body-on-frame construction may incorporate the elements that are shown and described herein.

Figure 1:
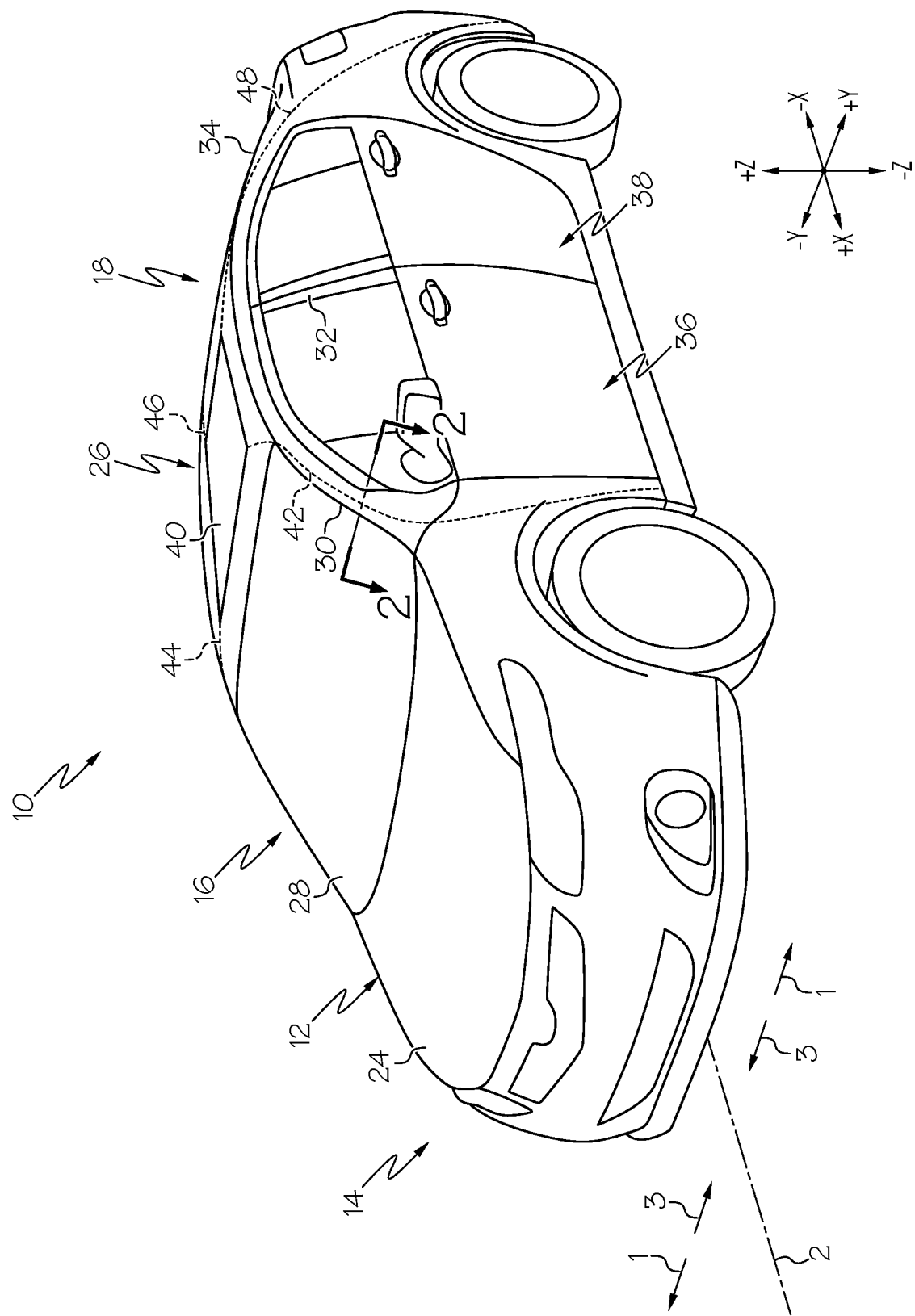
FIG. 1 depicts a perspective view of a vehicle, according to one or more embodiments shown and described herein.

Referring to FIG. 1, a vehicle 10 is depicted. The vehicle 10 includes a body 12 that includes a forward section 14, a cabin section 16, and a rear section 18. The forward section 14, the cabin section 16, and the rear section 18 may be integral with the body 12. The cabin 16 generally defines a passenger cabin of the vehicle 10. The forward section 14 may include a hood 24. The hood 24 may generally cover an engine compartment of the vehicle 10. The cabin section 16 may include a roof 26. The roof 26 may span in the vehicle longitudinal and vehicle lateral directions to cover the cabin section 16 of the vehicle 10. A windshield 28 may generally span between the hood 24 and the roof 26. The windshield 28 may serve as a forward boundary of the cabin section 16.

The body 12 may include an A-pillar 30, a B-pillar 32, and a C-pillar 34 that extend upward from the body 12 in the vehicle vertical direction. The A-pillar 30 is positioned forward of the B-pillar 32 and the B-pillar 32 is positioned forward of the C-pillar 34. Other bodies may include additional pillars, such as a D-pillar and E-pillar. As used herein the terms "forward pillar assembly" and "rearward pillar assembly" are used to refer to the relative location of the A-pillar 30, B-pillar 32, and C-pillar 34 with respect to one another. For example, in one embodiment, the A-pillar 30 is a forward pillar assembly and the B-pillar 32 is a rearward pillar assembly that is positioned rearward of the forward pillar assembly in the vehicle longitudinal direction. In embodiments, the B-pillar 32 can be the forward pillar assembly and the C-pillar 34 can be the rearward pillar assembly that is positioned rearward of the forward pillar assembly in the vehicle longitudinal direction.

The vehicle 10 may include one or more door assemblies coupled to the body 12 of the vehicle 10. A front door assembly 36 may be coupled to the A-pillar 30 and a rear door assembly 38 may be coupled to the B-pillar 32. In some embodiments, the front door assembly 36 is hingedly coupled to the A-pillar 30 and the rear door assembly 38 is hingedly coupled to the B-pillar 32. In other embodiments, the rear door assembly 38 may be severally coupled to the B-pillar 32, such as when the rear door assembly 38 is sliding door or when the rear door assembly 38 is hingedly coupled to the C-pillar 34 (i.e., a rear-hinged door). The front door assembly 36 and the rear door assembly 38 may facilitate ingress and egress to the cabin section 16 of the vehicle 10.

In this example, the vehicle 10 includes a sunroof 40 formed through the roof 26. While the vehicle 10 includes a sunroof 40, other vehicles may not include sunroofs. Because the sunroof 40 is exposed to the environment, the vehicle 10 may be provided with one or more drain hoses 42, 44, 46 and 48 that are fluidly connected to four corners of the sunroof 40. In vehicles without sunroofs, the vehicles may not include drain hoses. The drain hoses 42, 44, 46 and 48, when present, may each extend through a respective channel of the A-pillars 30 and the C-pillars 34. In some embodiments drain hoses may extend through B-pillars 32.

Figure 2:
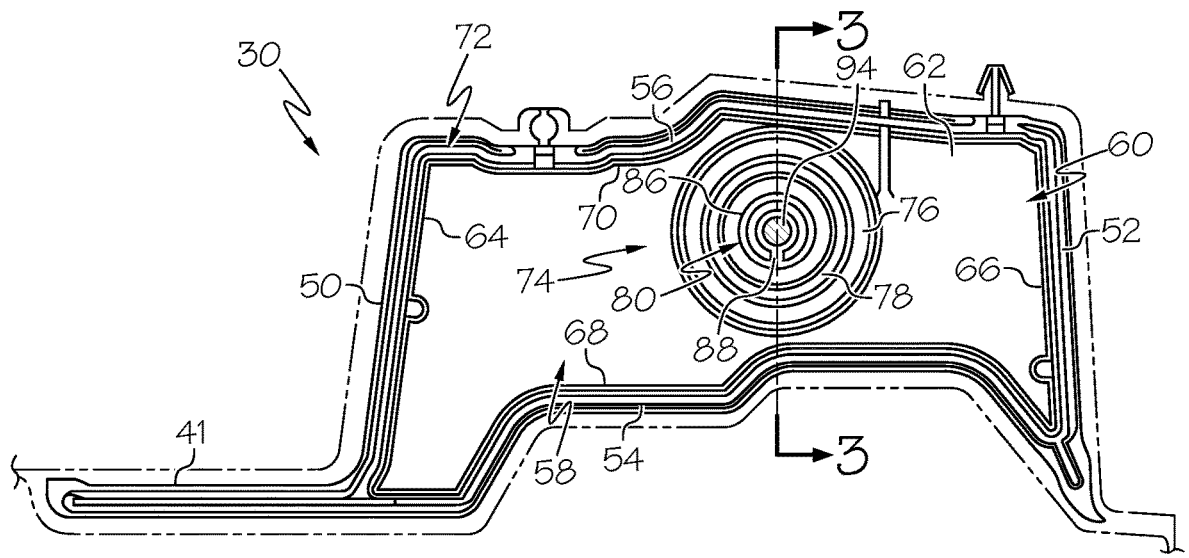
FIG. 2 depicts a section view showing a pillar channel along line 2-2 of FIG. 1, according to one or more embodiments shown and described herein.

Referring to FIG. 2, an internal section view of the A-pillar 30 is illustrated without the respective drain hose. While the A-pillar is illustrated, any of the other pillars may include pillar channel seals as described herein. The A-pillar 30 includes a body panel 41 that includes pillar walls 50, 52, 54 and 56 that together define a pillar channel 58 that extends in both the vehicle longitudinal and vertical directions from the roof 26 toward the ground. Located in the pillar channel 58 is a pillar channel seal 60. The pillar channel seal 60 includes a seal body 62 that is sized and configured to be received inside the pillar channel 58. In particular, the seal body 62 may include an edge 64 that abuts pillar wall 50, an edge 66 that abuts pillar wall 52, an edge 68 that abuts pillar wall 54 and an edge 70 that abuts pillar wall 56. The seal body 62 may be generally planar and may be shaped such that the edges 64, 66, 68 and 70 co-extend with the pillar walls 50, 52, 54 and 56 such that an air gap 72 (FIG. 3) is reduced between the seal body 62 and the pillar walls 50, 52, 54 and 56 thereby providing a barrier against sound passing by the pillar channel seal 60 into the cabin 16.

Figure 3:
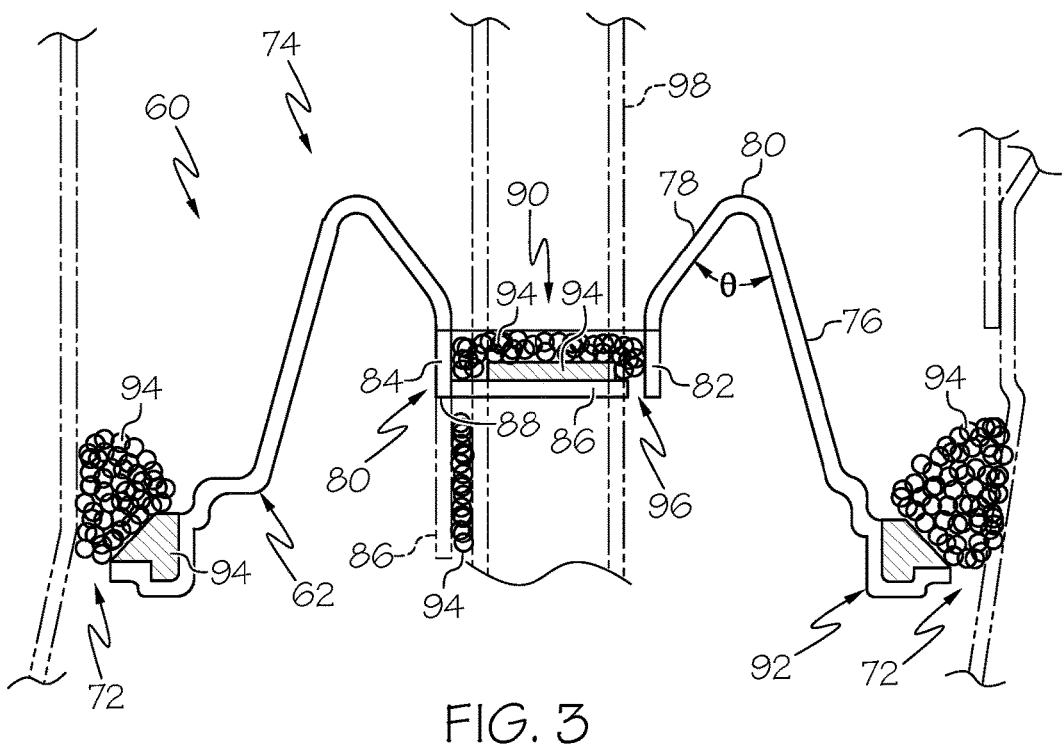
FIG. 3 depicts a section view along line 3-3 of FIG. 2, according to one or more embodiments shown and described herein.

Referring also to FIG. 3 showing a side view of the pillar channel seal 60 including the seal body 62, the pillar channel seal 60 includes a hose passage region 74 that may include an outwardly extending wall 76 that extends outward from the plane formed by the seal body 62. As can be seen from FIG. 2, the hose passage region 74 may be generally circular or round in shape, but may be any other suitable shape, such as rectangular, irregular, etc., for example, depending on a cross-sectional shape of a drain hose when present. In some embodiments, the hose passage region 74 may be formed as an integral part of the seal body 62, for example, using a molding process. The hose passage region 74 further includes an inward extending wall 78 that extends from the outward extending wall 76 and is connected thereto at a bend 80 such that an acute angle θ (less than 90 degrees) is formed between the inward extending wall 78 and the outward extending wall 76. A plug region 80 is provided at an end 82 of the inward extending wall 78. The plug region 80 is formed by a connecting wall 84 that is connected to a moveable plug 86, for example, by a living hinge 88. In a closed configuration, the moveable plug 86 closes (e.g., at least partially) a pass-through opening 90 formed by the connecting wall 84.

Referring particularly to FIG. 3, the moveable plug 86 and a ledge portion 92 of the seal body 62 carry an expandable foam 94. The expandable foam 94 may be formed as part of the moveable plug 86 and the ledge portion 92, for example, in a two-shot molding and/or 3D printing process. As shown by solid lines in FIG. 3, the expandable foam 94, once expanded, may close a gap 96 between the moveable plug 86 and the connecting wall 84. As shown by dashed lines in FIG. 3, when a drain hose 98 is inserted through the pass-through opening 90, the moveable plug 86 can pivot out of the pass-through opening 90 to an open configuration. Instead of covering the gap 96, in the open configuration, the expandable foam 94, once expanded, can extend between the moveable plug 86 and the drain hose 98 and at least partially surround the drain hose 98.

During assembly of the vehicle 10, various functions of the assembly process (e.g., painting and heat treatment) may be carried out at particular points in the assembly process and various pieces and parts of the vehicle 10 may be assembled on the vehicle 10 at particular points in the assembly process. In some embodiments, the expandable foam 94 may comprise a heat-activated polymer that is heated as the vehicle body 12 (FIG. 1) undergoes heat treatment after painting. The expansion of the expandable foam may occur at or above a preselected temperature selected between 150 and 400° F.

The above-described pillar channel seals can provide a seal body that can be used to seal a pillar cavity of one, some or all of the pillars of vehicles. The pillar channel seals can be used to limit an amount of noise that travels upward through the pillars toward the passenger cabin. The pillar channel seals include a moveable plug that covers a pass-through opening through the seal body when no drain hose is present. If a drain hose is present, the moveable plug is configured to move out of the way allowing the drain hose to pass therethrough. An expandable foam is provided that can be heat activated to expand at a preselected temperature. The temperature may be selected within a temperature range experienced by the vehicle body during a heat treatment process. Once expanded, the expandable foam can cover the pass-through opening and/or spaces between the seal body and pillar walls to further reduce noise passage. The expandable foam can form part of the seal body by forming the seal body using a molding and/or a 3D printing process. The expandable foam may be heat-activated at heat treatment temperatures so that the foam will expand during routine paint curing of the vehicle in a paint baking oven.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a vehicle body comprising a pillar having a pillar channel extending therethrough; and
a pillar channel seal comprising:
   a seal body located in the pillar channel, the seal body having a pass-through opening sized to receive a drain hose;
   a moveable plug movably attached to the seal body that is configured to cover the pass-through opening in a closed configuration; and
   an expandable foam carried by the moveable plug.

2. The vehicle of claim 1, wherein the expandable foam is an integral part of the moveable plug.

3. The vehicle of claim 1, wherein the expandable foam is configured to expand at a preselected temperature to fill a gap between the moveable plug and the seal body when the moveable plug is in the closed configuration.

4. The vehicle of claim 1 further comprising a drain hose that passes through the pass-through opening, the drain hose placing the moveable plug in an open configuration at least partially removed from the pass-through opening.

5. The vehicle of claim 4, wherein the expandable foam is configured to at least partially fill a gap between the moveable plug and the drain hose.

6. The vehicle of claim 1, wherein the seal body comprises a ledge portion that is located adjacent walls of the pillar channel, the ledge portion comprising expandable foam.

7. The vehicle of claim 6, wherein the expandable foam carried by the ledge portion is configured to expand at the predetermined temperature to cover a gap between the ledge portion and at least one of the walls of the pillar channel.

8. A pillar channel seal configured to be located in a pillar channel of a vehicle, the pillar channel seal comprising:
   a seal body having a pass-through opening sized to receive a drain hose;
   a moveable plug movably attached to the seal body that is configured to cover the pass-through opening in a closed configuration; and
   an expandable foam carried by the moveable plug.

9. The pillar channel seal of claim 8, wherein the expandable foam is an integral part of the moveable plug.

10. The pillar channel seal of claim 8, wherein the expandable foam is configured to expand at a preselected temperature to fill a gap between the moveable plug and the seal body when the moveable plug is in the closed configuration.

11. The pillar channel seal of claim 8, wherein the seal body comprises a ledge portion that is configured to be located adjacent walls of the pillar channel, the ledge portion comprising expandable foam.

12. The pillar channel seal of claim 11, wherein the expandable foam carried by the ledge portion is configured to expand at a predetermined temperature to cover a gap between the ledge portion and at least one of the walls of the pillar channel.

* * * * *

UNITED STATES PATENT AND TRADEMARK OFFICE
CERTIFICATE OF CORRECTION

| | | |
|---|---|---|
| PATENT NO. | : 12,151,744 B2 | Page 1 of 1 |
| APPLICATION NO. | : 17/890470 | |
| DATED | : November 26, 2024 | |
| INVENTOR(S) | : Adam D. Holmstrom and Paxton S. Williams | |

It is certified that error appears in the above-identified patent and that said Letters Patent is hereby corrected as shown below:

On the Title Page

Item (73), assignee 2, city, delete "Toyota (JP)" and insert --Toyota-shi Aichi-ken (JP)--, therefor.

Signed and Sealed this
Twenty-second Day of April, 2025

Coke Morgan Stewart
*Acting Director of the United States Patent and Trademark Office*